US006586502B2

(12) United States Patent
Wallace et al.

(10) Patent No.: US 6,586,502 B2
(45) Date of Patent: Jul. 1, 2003

(54) INORGANIC/ORGANIC COMPOSITIONS

(75) Inventors: Penny Jo Wallace, Hope, MI (US); Yi-Hung Chiao, Temple City, CA (US); Donald L. Schmidt, Midland, MI (US); Tao Sun, Midland, MI (US); Marc Stephen Hirsch, Midland, MI (US); Nicholas P. Sheridan, Auburn, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/838,632

(22) Filed: Apr. 19, 2001

(65) Prior Publication Data

US 2002/0022682 A1 Feb. 21, 2002

Related U.S. Application Data

(63) Continuation-in-part of application No. 09/422,572, filed on Oct. 21, 1999, now abandoned.

(51) Int. Cl.$^7$ .................................................. C08K 7/00
(52) U.S. Cl. ....................................................... 523/220
(58) Field of Search .......................................... 523/220

(56) References Cited

U.S. PATENT DOCUMENTS

| 3,708,225 A | 1/1973 | Misch et al. |
| 3,976,497 A | 8/1976 | Clark |
| 3,986,997 A | 10/1976 | Clark |
| 4,277,287 A | 7/1981 | Frye |
| 4,355,135 A | 10/1982 | January |
| 4,405,679 A | 9/1983 | Fujioka et al. |
| 4,477,499 A | 10/1984 | Doin et al. |
| 4,559,271 A | 12/1985 | Doin et al. |
| 5,173,368 A | * 12/1992 | Belmares ..................... 428/426 |
| 5,869,185 A | 2/1999 | Bahr et al. |
| 5,925,447 A | * 7/1999 | Gust .......................... 428/219 |
| 6,353,037 B1 | * 3/2002 | Thunhorst .................... 521/64 |
| 6,472,467 B1 | 10/2002 | Chiao ......................... 524/755 |

FOREIGN PATENT DOCUMENTS

EP 0 157 030 B1 7/1989

OTHER PUBLICATIONS

J. F. Lynch (Ed.), *Engineering Property Data on Selected Ceramics, vol. III, Single Oxides*, Metals and Ceramics Information Center Battelle Columbus Labs, Jul. 1981, vol. III, pp. 3.0–1–3.0–3, p. 5.4.0–6.
W. Xie, Y. Jin, P.G. Wang, *Lanthanide Triflates as Unique Lewis Acids*, Chemtech, Feb. 1999, pp 23–29.
C.F. Baes, Jr., R.F. Mesmer, *The Hydrolysis of Cations*, Kreiger Publ., 1976, Chapter 18, p. 408.

* cited by examiner

Primary Examiner—Edward J. Cain

(57) ABSTRACT

Compositions comprising inorganic particles or inorganic-organic particles, a non-hydrogen Lewis Acid, and an epoxy group-containing silicon compound, articles coated with the cured composition to provide scratch and abrasion resistance.

66 Claims, No Drawings

INORGANIC/ORGANIC COMPOSITIONS

CROSS-REFERENCE STATEMENT

This application is a continuation in part of application Ser. No. 09/422,572 filed Oct. 21, 1999 now abandoned.

The present invention relates generally to improved protective or hard coating compositions and coated articles. More specifically, the present invention relates to novel hard coatings produced from novel compositions containing two different inorganic components plus a third component, which contains cross-linkable organic functionality. Particularly, such coating compositions and coated articles employ silicone resin coating compositions which when applied to a substrate form a protective abrasion-resistant coating thereon.

BACKGROUND OF THE INVENTION

For purposes of the present specification, a hard coating will refer to a coating that exhibits good mechanical properties, such as scratch-resistance and abrasion-resistance. There are many different approaches known in the art for producing hard coatings. These hard coatings are utilized in many different applications. For example, hard coatings are often used to protect furniture, as well as to protect various parts of an automobile.

The substitution of glass glazing with transparent materials which do not shatter or are more resistant to shattering than glass has increased. Such transparent glazing made from synthetic organic polymers is not utilized in public transportation vehicles, such as trains, buses, taxis and airplanes. Also, lenses for eyeglasses and other optical instruments, as well as glazing for large building employ shatter-resistant transparent plastics. The lighter weight of such transparent plastics is a further advantage. However, such transparent plastics have the drawback of being easily marred and scratched because of everyday contact with abrasives, such as dust, cleaning equipment and ordinary weathering. Continuous scratching and marring results in impaired transparency and poor aesthetics, requiring replacement. This includes polycarbonates such as Calibre® brand polycarbonate sold by The Dow Chemical Company and Lexano brand polycarbonate sold by General Electric Company. Attempts to improve the abrasion resistance of transparent plastics and to provide articles with hard coatings which are scratch resistant have employed coatings formed from mixtures of silica, such as colloidal silica or silica gel, and hydrolyzable silanes in a hydrolysis medium, such as alcohol and water, as taught in U.S. Pat. Nos. 3,708,225; 3,986,997 and 3,976,497.

It is also known in the art to produce hard coatings using sol-gel processes and techniques. It is further known that the formation of dense, pure inorganic coatings by the sol-gel route requires heating. The amount of heat necessary to produce dense, pure inorganic coatings makes it prohibitive to coat certain materials, such as plastic substrates. Additionally, pure inorganic coatings are brittle due to their high (three-dimensional) inorganic network connectivity.

The introduction of organic components to sol-gel compositions can lead to a reduction of overall inorganic network connectivity in coatings and allow coatings to be produced at lower temperatures. Also, the inclusion of organic components allows coatings to be more flexible viscoelastic (that is, less brittle) while maintaining good scratch resistance and abrasion resistance. Some of these inorganic/organic coatings have become known as ormosils (organically modified silicates), ormocer (organically modified ceramics), or nanomers (nanoparticle and organic component containing polymer type materials).

However, up to now these inorganic/organic coatings have suffered from a number of deficiencies. First, it has been extremely difficult, if not impossible in some cases, to produce coatings having an inorganic portion greater than about 40 percent by weight. Coatings having less inorganic content will have insufficient abrasion resistance or insufficient scratch resistance for many applications. Second, the inorganic/organic coating compositions of the prior art are either sensitive to water or immiscible in water, requiring organic solvents that may be expensive, difficult, or even hazardous to use.

Accordingly, there exists a need in the industry for hard coatings that can be easily and economically produced at low temperatures. The present invention addresses these concerns.

SUMMARY OF THE INVENTION

In one aspect, the present invention is composition that can be easily utilized to produce hard coatings. Compositions of the present invention comprise a) dispersion of inorganic particles in the composition, said particles having a size of from about 1 nanometer to about 100 nanometers; b) a non-hydrogen Lewis Acid, the weight percent of said Lewis Acid comprising from about 0.1 percent to about 30 percent of the total weight of the composition and c) an epoxy group-containing silicon compound dispersed substantially uniformly in the solution.

In one preferred embodiment, compositions of the present invention are aqueous dispersions. Although other liquid media may be used in dispersions of the present invention to produce coatings of the present invention, an important advantage of the present invention is that compositions of the present invention can be produced using only water as a dispersing medium. Preferably, the dispersions are substantially uniformly made in the composition.

The components in compositions of the present invention can be mixed in a variety of ways known in the art. A preferred method for mixing the components is to first prepare a dispersion containing the inorganic particles and add to it the epoxy group-containing silicon compound, after which is added the non-hydrogen Lewis Acid in the liquid medium. The compounds themselves or a solution containing the epoxy group-containing silicon compound or the non-hydrogen Lewis Acid can be used with a liquid medium being employed.

The method of producing coatings from the compositions of the present invention is not particularly critical. The coatable composition is first applied to a substrate to be coated and then the composition is cured to produce the cured coating composition on the substrate. Compositions of the present invention are cured in one of two ways depending on whether the solvent or liquid medium present needs to be removed or whether the solvent or liquid medium is reactable. The first method of curing is to first remove the solvent or liquid medium and then apply appropriate stimulus (for example, heat or UV light) to cross-link or polymerize the epoxy group-containing silicon compound. The second method of curing compositions of the present invention, used when a reactable liquid medium is present, is to react the liquid medium, instead of removing it, and cross-link or polymerize the epoxy group-containing silicon compound by applying appropriate stimulus.

A preferred method for curing compositions of the present invention, especially for coatable compositions containing aqueous dispersions, is to apply sufficient heat to the solution to remove the liquid medium and promote the cross-linking. Generally, compositions of the present invention can be cured at a temperature that is sufficiently low to allow compositions of the present invention to be cured on plastic substrates, such as substrates made of polycarbonate, polyethylene terephthalate (PET), polyethylenenaphthalenate (PEN), polyvinyl chloride (PVC), polymethylmethacrylate (PMMA), polyolefins, polysulfone, epoxy resins, polyurea and polyurethane.

In yet another aspect, the present invention is a novel composition that can be utilized as an abrasion-resistant coating. Compositions of the present invention comprise a) inorganic particles dispersed substantially uniformly throughout the composition, said particles having a size of from about 1 nanometer to about 100 nanometers, b) a non-hydrogen Lewis Acid or surface modifier dispersed substantially uniformly throughout the composition and c) an epoxy group-containing silicon compound.

DETAILED DESCRIPTION OF THE INVENTION

Coatable compositions and cured coatings of the present invention comprise at least one inorganic or inorganic-organic composite particulate component, a non-hydrogen Lewis Acid and at least a third component, which contains cross-linkable organic functionality.

The present invention employs a coatable composition comprising:

a) at least one dispersion of particles selected from the group consisting of inorganic particles and inorganic-organic composite particles, said particles having a size of from about 1 nanometer to about 100 nanometers;

b) at least one non-hydrogen Lewis Acid ; and c) at least one epoxy group-containing silicon compound, said dispersion being present in said composition such that said composition contains from about 1 to about 50 weight percent of said particles in the total weight of said composition, said non-hydrogen Lewis Acid being present in from about 0.1 to about 30 weight percent of the total weight of said composition and said epoxy group-containing silicon compound is present at from about 1 to about 50 weight percent of the total weight of said composition.

The first component comprises at least one dispersion of particles selected from the group consisting of inorganic particles and inorganic-organic composite particles dispersed substantially uniformly in the composition which have a size from about 1 nanometer to about 100 nanometers. Particles having a density higher than the liquid medium and a size larger than about 100 nanometers will tend to settle out of low viscosity solutions when stored for longer periods of time. Thus, inorganic particles used in the present invention must have a size less than about 100 nanometers or the resulting composition may not be sedimentation-free during storage (that is, not storage stable).

If clear coatings are desired, the inorganic particles should have a size of less than about 50 nanometers. Preferred inorganic particles will have a size of no more than about 40 nanometers. More preferably, inorganic particles used in the present invention will have a size of no more than about 30 nanometers.

In compositions of the present invention, the inorganic particles or inorganic-organic composite particles should be dispersed substantially uniformly in solution. Uniform dispersion facilitates adequate mixing of all components and allows for production of uniform coatings.

Inorganic particles useful in embodiments of the present invention include both natural and synthetic ceramics, clays, minerals, metals, metal alloys, and mixtures of these. Examples of useful ceramics, clays, and minerals are oxides, hydroxides, carbides, borides, phosphides, titanates, tungstenates, nitrides, silicides, fluorides, sulfides, carbonates, and silicates. Preferred inorganic particles are those with an oxide or hydroxide surface. Typical of the oxides are aluminum oxide, barium oxide, beryllium oxide, calcium oxide, cerium oxide, chromium oxide, dysprosium oxide, erbium oxide, europium oxide, gadolinium oxide, hafnium oxide, holmium oxide, lanthanum oxide, lutetium oxide, magnesium oxide, neodymium oxide, plutonium oxide, praseodymium oxide, samarium oxide, scandium oxide, silicon dioxide, strontium oxide, tantalum oxide, terbium oxide, thorium oxide, thulium oxide, titanium oxide, uranium oxide, vanadium oxide, ytterbium oxide, yttrium oxide, and zirconium oxide. More preferred inorganic particles are utilized as oxide sols, that is, the inorganic particles in a solvent or liquid medium. It is particularly preferred to utilize inorganic particles in the form of aqueous sols of silica, alumina, aluminum hydroxide, ceria, titania, and zirconia.

The second component of the composition is a non-hydrogen Lewis Acid. For purposes of the present specification, the non-hydrogen Lewis Acid can also be considered to be a "surface modifier" because photomicrographs taken show that, in coatings of the present invention, the modifiers can precipitate onto, adhere to, or bond to the surface of the inorganic particles.

The non-hydrogen Lewis Acid should be dispersed substantially uniformly in compositions of the present invention. By dispersed substantially uniformly, it is meant that the non-hydrogen Lewis Acids or surface modifiers are substantially uniformly distributed throughout the composition and mix with the other components.

The surface modifier or non-hydrogen Lewis Acid should constitute from about 0.1 percent to about 30 percent of the total weight of the inorganic phase (that is, the total combined weight of the inorganic particles and the surface modifier). Preferably the surface modifier will constitute from about 0.1 weight percent to about 20 weight percent of the inorganic phase.

Non-hydrogen Lewis Acids useful in the present invention may include species that react with the liquid medium to form nanometer scale sols or micelle suspensions in the liquid medium. For example, metal chlorides react with water to form metal hydroxide sols. Useful surface modifiers or non-hydrogen Lewis Acids are those that can be made to precipitate onto the surfaces of the inorganic particles by processes, such as ion exchange, ion removal, changes in pH, changes in concentration of modifier, changes in temperature, changes in pressure, or by other physical, chemical, optical, or mechanical stimulation. A preferred method for causing the surface modifiers or non-hydrogen Lewis Acids to precipitate onto the surfaces of the inorganic particles is the removal of the liquid medium from compositions of the present invention. Ion exchange techniques can also be utilized to precipitate modifiers onto the surfaces of the inorganic particles without the removal of liquid medium.

Typical metal compounds are those which include non-hydrogen Lewis Acids represented by the general formula

in which M is a cation selected from groups 2, 3, 4, 5, 6, 7, 8, 9, 10, 11, 12, 13, 14, the Lanthanide Series, the Actinide Series of the Periodic Table; X is an counterion; m is an integer from 1 to 3; and n is an integer from 1 to 3. Typical counterions are chloride, methyl sulfonate, perchlorate, trifluorosulfonate, and trifluoroacetate. Typical cations are aluminum, lanthanum, scandium and ytterbium.

When the inorganic surface modifier is a Lewis acid metal compound, the present invention can comprise a three component coating formulation which, when applied to a substrate and cured, becomes a hard scratch-resistant coating. The three component formulation comprises: firstly, a colloidal silica or silica sol, secondly, an epoxy silane or siloxane, and finally, a compatible metal cation which functions as a Lewis acid. The non-hydrogen Lewis Acids which have been successfully employed are aluminum chloride, perchlorate, sulfate, trifluoroacetate, and triacetate; ytterbium chloride, perchlorate, triflate and trifluoroacetate; lanthanum triflate; nickel perchlorate; cobalt perchlorate; Zinc perchlorate, triflate and trifluoroacetate.

Non-hydrogen Lewis Acids useful in the present invention include inorganic salts, organometallic compounds, ceramic precursors, ceramics, clays, minerals, metals, metal alloys, or mixtures of these. Preferred surface modifiers for aqueous solutions are metal salts, such as aluminum chlorides, aluminum oxychlorides, and tin chlorides.

Epoxy group-containing silicon compounds useful in the present invention include organic compounds and organometallic compounds, and their oligomers, adducts, condensates, and reaction products, which can be dispersed substantially uniformly in compositions of the present invention. By dispersed substantially uniformly, it is meant that the epoxy group-containing silicon compounds are substantially uniformly distributed throughout the solution and mix with the other components of the solution. Preferably, epoxy group-containing silicon compounds useful in the present invention are dispersible in the liquid medium utilized. The cross-linkers can become insoluble or otherwise non-dispersible in the liquid medium by changes in pH, changes in concentration of cross-linker, changes in temperature, changes in pressure, or by other physical, chemical, optical, irradiation, or mechanical stimulation.

Most preferred are epoxy group-containing silicon compounds. A most highly preferred epoxy group-containing compound is the epoxy group-containing silicon compound having the general formula

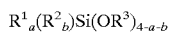

$$R^1_a(R^2_b)Si(OR^3)_{4-a-b}$$

wherein $R^1$ is selected from an epoxy-containing organic group, $R^2$ is selected from C1–6 hydrocarbyl groups, a vinyl group, and hydrogen; $R^3$ is selected from C1–5 hydrocarbyl groups, a C2–12 alkoxyalkyl group, and a C1–4 acyl group; a is an integer from 1 to 3, b is an integer from 0 to 2, providing that the sum of a plus b is less than or equal to 3. Typical of such silicon compounds containing one glycidoxy group are glycidoxymethyl trimethoxysilane, glycidoxymethyl triethoxysilane, β-glycidoxyethyl trimethoxysilane, β-glycidoxyethyl triethoxysilane, γ-glycidoxypropyl trimethoxysilane, γ-glycidoxypropyl triethoxysilane, γ-glycidoxypropyl tri(methoxyethoxy)silane, γ-glycidoxypropyl triacetoxysilane, δ-glycidoxybutyl trimethoxysilane, δ-glycidoxybutyl triethoxysilane, glycidoxymethyl dimethoxysilane, glycidoxymethyl(ethyl)dimethoxysilane, glycidoxymethyl(phenyl)dimethoxysilane, glycidoxymethyl (vinyl)dimethoxysilane, glycidoxymethyl(dimethyl) methoxysilane, β-glycidoxyethyl(methyl)dimethoxysilane, β-glycidoxyethyl(ethyl)dimethoxysilane, β-glycidoxyethyl (dimethyl)methoxysilane, γ-glycidoxypropyl(methyl) dimethoxysilane, γ-glycidoxypropyl(ethyl)dimethoxysilane, γ-glycidoxypropyl(dimethyl)methoxysilane, δ-glycidoxybutyl(methyl)dimethoxysilane, δ-glycidoxybutyl(ethyl)dimethoxysilane, and δ-glycidoxybutyl(dimethyl)methoxysilane.

Typical epoxy group-containing silicon compounds containing two or three glycidoxy groups are bis-(glycidoxymethyl) dimethoxysilane, bis-(glycidoxymethyl) diethoxysilane, bis-(glycidoxymethyl) dimethoxysilane, bis-(glycidoxyethyl) diethoxysilane, bis-(glycidoxypropyl) dimethoxysilane, bis-(glycidoxypropyl) diethoxysilane, tris-(glycidoxymethyl) methoxysilane, tris-(glycidoxymethyl) ethoxysilane, tris-(glycidoxyethyl) methoxysilane, tris-(glycidoxyethyl) ethoxysilane, tris-(glycidoxypropyl) methoxysilane, and tris-(glycidoxypropyl) ethoxysilane.

Typical epoxy group-containing silicon compounds containing glycidyl groups are glycidylmethyl trimethoxysilane, glycidylmethyl triethoxysilane, β-glycidylethyl trimethoxysilane, β-glycidylethyle thriethoxysilane, β-glycidylpropyl trimethoxysilane, γ-glycidylpropyl triethoxysilane, γ-glycidylpropyl tri (methoxyethoxy)silane, and γ-glycidylpropyl triacetoxysilane. Typical alicyclic epoxy group-containing silicon compounds are 3,4-epoxycyclohexylmethyl trimethoxysilane, 3,4-epoxycyclohexylmethyl triethoxysilane, 3,4-epoxycyclohexylethyl trimethoxysilane, 3,4-epoxycyclohexylpropyl trimethoxysilane, and 3,4-epoxycyclohexylbutyl trimethoxysilane.

The amount of epoxy group-containing silicon compound present in compositions of the present invention should be measured relative to the amount of total solids. The cross-linker should comprise no more than about 70 weight percent, of the solids. Generally, the cross-linker will comprise at least about 25 weight percent of the solids The compositions of the present invention may also include the hydrolysis and condensation polymerization products of the organo silicon compounds used in this invention. Where water is present in such compositions the hydrolyzates and condensation products form even in small amounts when contact is made between the epoxy group containing compounds which have alkoxides as a part of the compound. First the alkoxide is partially hydrolyzed and then condensation of the hydrolyzed alkoxide proceeds.

There are two types of liquid media that are useful in compositions of the present invention. The first type of liquid medium acts as a carrier medium for the other solution components and must be removed from compositions of the present invention during the process of producing a coating from these compositions. Liquid media of the first type that are useful in compositions of the present invention include water, organic solvents, and mixtures thereof. Preferred liquid media are water, alcohols, ketones, glycol ethers, glycol esters, and mixtures of these. A particularly preferred liquid medium is water. In fact, it is a particularly advantageous aspect of the present invention that compositions and coatings of the present invention can be produced utilizing water as the only liquid medium.

The second type of liquid medium useful in compositions of the present invention are liquid media that do not have to be removed from compositions of the present invention during the process of producing a coating from these compositions. For purposes of this specification, these liquid media will be referred to as reactable liquid media. Instead of being removed from solution, these reactable liquid media undergo a cross-linking or polymerization reaction. One advantage of using these reactable liquid media is that, in some embodiments of the present invention, the same stimulus used to initiate cross-linking or polymerization in the cross-linker can be used to initiate the reaction of the liquid medium as well. In this manner, coatings can be produced from compositions of the present invention utilizing these reactable liquid media in a single step. Typically, the stimulus to initiate the reaction of both the epoxy group-containing silicon compound and the liquid medium is the application of UV light or electron beam.

Examples of reactable liquid media useful in compositions of the present invention include epoxies, acrylates, and vinyl ethers. Preferred examples include cycloaliphatic epoxies, epoxy acrylates, and urethane acrylates.

The amount of liquid medium needed for compositions of the present invention is not particularly critical. There must be sufficient liquid medium present in the solution to allow the other components present to be dispersed substantially uniformly in the solution.

Generally, in compositions of the present invention, the liquid medium comprises at least about 10 weight percent and no more than about 90 weight percent of the solution. Typically, the liquid medium comprises at least about 25 weight percent and no more than about 75 weight percent of the solution. Within the limits discussed above, the amount of liquid medium present in compositions of the present invention can be adjusted to produce a solution having a desired viscosity without significantly affecting the chemical nature of the resulting coating to be produced.

Generally, the higher the percentages of inorganic phase (that is, less cross-linker) the more abrasion-resistant a resulting coating will be. Also, small inorganic particles will have more total surface area, requiring a higher percentage of epoxy group-containing silicon compound. Spherical shaped particles or particles with low aspect ratios are preferred for achieving high particle packing density in coatings of the present invention.

Certain organic or inorganic materials; including organics, such as, resorcinols, benzotriazols and inorganics, such as titania, ceria, iron oxide, chromic oxide, vanadium oxide; have ultraviolet ("UV") light scattering and absorption capability. By incorporating these materials into compositions of the present invention, coatings can be produced that provide protection (that is, UV blocking) to UV-sensitive substrates. The present invention offers unique advantages in allowing high loads of these UV-blocking inorganic materials to be uniformly distributed throughout coatings of the present invention.

Useful UV-blocking materials can be introduced in compositions and coatings of the present invention as the inorganic particles, as the non-hydrogen Lewis Acids, or as part of an organometallic cross-linker Examples include using silica sols or titania sols and can be utilized in conjunction with a surface modifier comprising a cerium compound or cerium salt. Still further, zinc oxides can be used as UV-blockers. Examples of UV-blockers are benzotriazole compounds, specifically the hydroxyphenyl benzotriazole compounds, a number of which are available from Ciba Geigy under the trademark "TINUVIN". A typical example is 2-(2'-hydroxy-5'-methylphenyl) benzotriazole. A most preferred material is Tinuvin 1130. Additionally, an organotitanate cross-linker can be advantageously utilized in UV-blocking coatings of the present invention.

Combinations of inorganic particles, surface modifiers, and cross-linkers can be used in a single coating or in multilayer sequential coatings to adjust, or optimize, the UV and visible light transmission characteristics, mechanical properties, and refraction index tailoring of coatings.

The components in compositions of the present invention can be mixed in a variety of ways known in the art. In fact, it is a unique advantage of the present invention that the components can be easily mixed and uniformly dispersed in solutions. It is a further advantage that the components can be easily mixed and uniformly dispersed in compositions of the present invention that are substantially, or even entirely, aqueous. The surface modifiers and cross-linkers can be dispersed in the liquid medium in four different ways: a) in solution form; b) in sol or micelle form; c) attached to the surface of the inorganic particles, forming a shell or partial shell around the inorganic particles; and d) combinations of a), b), and c). Once the components are mixed together, uniform dispersion of all components can be facilitated, if necessary, by subjecting compositions of the present invention to sonification, utilizing equipment such as a VibraCell 700 Watt ultrasonic horn (available from Sonics and Materials).

Another aspect of this invention is a cured composition produced by the process which comprises the steps of
i) mixing together
   a) at least one dispersion of particles selected from the group consisting of inorganic particles and inorganic-organic composite particles, said dispersion substantially uniformly distributed in the composition, said particles having a size of from about 1 nanometer to about 100 nanometers;
   b) at least one non-hydrogen Lewis; and
   c) at least one epoxy group-containing silicon compound, to form a mixture; and
ii) curing said mixture to form an abrasion resistant composition.

The method of producing coatings from compositions of the present invention is not particularly critical. The solution is first applied to a substrate to be coated and then the solution is cured to produce the coating. Generally, compositions of the present invention can be cured at a temperature that is sufficiently low to allow compositions of the present invention to be cured on plastic substrates, such as substrates made of polycarbonate, polyethylene terephthalate (PET), polyethylenenaphthalenate (PEN), polyvinyl chloride (PVC), polymethylmethacrylate (PMMA), polyolefins, polysulfone, epoxy resins, polyurea and polyurethane.

Compositions of the present invention are cured in one of two ways depending on whether the liquid medium present needs to be removed or whether the liquid medium is a reactable liquid medium. The first method of curing is to first remove the liquid medium and then apply appropriate stimulus (for example, heat or UV light) to cause any cross-linkable moieties in the cross-linker (for example, epoxy functionality) to cross-link or polymerize. Examples of cross-linking or polymerization mechanisms include polycondensation or addition reaction mechanisms. A preferred method for curing compositions of the present invention, especially aqueous compositions, is to apply sufficient heat to the solution to remove the liquid medium and promote any cross-linking. The second method of curing compositions of the present invention, used when a reactable liquid medium is present, is to react the liquid medium, instead of removing it, and cross-link or polymerize the epoxy group-containing silicon compound by applying the appropriate stimulus. In preferred embodiments of the present invention, that same stimulus can be used to both react the liquid medium and to cross-link or polymerize the cross-linker.

Coatings of the present invention also contain a cross-linked organic component. This component consists essentially of the epoxy group-containing silicon compound described above, but differing in that the cross-linkable or polymerizable moieties on the cross-linker have been cross-linked or polymerized by appropriate stimulus.

One of the advantages of the present invention is that high loads of the inorganic phase can be achieved in coatings of the present invention. Unless stated otherwise in this specification, the "load" of inorganics will refer to the weight percent of the inorganic phase present in coatings of the present invention. The inorganic phase comprises at least about 30 percent by weight of coatings of the present invention.

Generally, coatings having higher loads of the inorganic phase will have better scratch and abrasion resistance than coatings having lower loads of the inorganic phase. Accordingly, in some preferred embodiments of coatings, the inorganic phase will comprise at least about 40 percent by weight, and preferably at least about 50 percent by weight. The inorganic phase may comprise up to about 75 percent by weight of the coating. Even higher inorganic loads can be achieved by using larger inorganic particles, but using larger particles may decrease solution stability and may decrease optical transmission of the resulting coatings.

Compositions and coatings of the present invention may include various additives so long as the additives are not included in amounts that substantially interfere with the function or effectiveness of the other components. One of ordinary skill in the art may choose different additives depending on a particular need for a particular application. Additives that one of ordinary skill in the art might consider incorporating into compositions and coatings of the present invention include surfactants, dispersants, adhesion promoters, leveling agents, pigments, dyes, latex, emulsion polymers, diluents, plasticizers, fillers, thickeners, defoaming agents, coupling agents, catalysts, blocking agents, hardeners, curing agents, flow control agents, buffering agents, organic resins, fungicides, wetting agents, photoinitiators, UV absorbers, light stabilizers, anti-oxidants, co-activators, and extenders.

For even better adhesion of the hard coating solution or final cured composition to a substrate, primer coating materials have been used. Such primers are known in the literature, but have not heretofore been employed with the compositions of this invention. Therefore, primer formulations of the prior art can be employed. However, it has been found that primer formulations with thermally cross-linkable aqueous latexes, such as CarbosetCR-781 in water from B. F. Goodrich, together with an acrylic polymer in a liquid medium, such as, Paraloid A-21 in toluene from Rohm and Haas, provide a good adhesion to various substrates, particularly plastics, wood, metal or coated metal surfaces, laminates, composites or other coating materials. Preferably the acrylic polymer can be an acrylate or methylmethacrylate, providing a polyacrylate or polymethylmethacrylate (PMMA). The liquid media used are those normally associated with such materials and can be aqueous or organic, such as water, alkanes, aromatics, alcohols, glycols or glycol ethers, ketones; with water, diacetone alcohol, Dowanol® PM brand propylene glycol methyl ether from The Dow Chemical Company. Mixtures of such liquid media can also be employed.

Another procedure to promote adhesion of the hard coat formulation to the substrate is the treatment of the substrate before coating with corona discharge. This procedure allows for increases in wetability and adhesion by affecting the polar surface energy and the relative surface energy of the coating. Corona discharge treatment provides a concentrated electric discharge, an atmospheric plasma, on to the surface of the polymer. This creates polar functional groups at the polymer surface, which promote wetability and adhesion and which may obviate the need for a primer to provide such benefits. Use of corona treatment with aqueous liquid medium compositions of this invention are especially advantageous in that there is no potential for combustion, which is not the case with organic liquid media-containing formulations. A still further aspect is the use of both corona discharge and primer prior to application of the hard coat formulation.

Compositions of the present invention can be advantageously utilized to coat many different substrates. For example, coatings of the present invention have been successfully produced on plastics, such as polycarbonate, polymethylmethacrylate, polyolefin, polyurethane, polyvinyl chloride, and polyethylene terephthalate, polyethylenenaphthalenate, polysulfones, polyurethanes, polyureas and epoxies; metals, such as aluminum foil, brass, and iron, wood, and glass.

Coatings of the present invention can be used in applications requiring barrier properties. For example, coatings of the present invention were applied to polyethylene terephthalate substrates. The coated substrates exhibited dramatically lower oxygen and water vapor transmission rates (that is, higher barrier properties) than the same polyethylene terephthalate substrates without the coating.

While the present specification has focussed on the formation of coatings, it should be noted that compositions of the present invention can be advantageously utilized to form other articles. For example, compositions of the present invention can be utilized to form stand alone films. One method of forming a film would be to form a thick coating on a removable substrate and then remove the coating from the substrate. Additionally, compositions of the present invention can be utilized to from three dimensional objects by pouring the solution into a mold and then curing the solution.

Data

A number of different coatings were produced and tested for abrasion resistance. A glass surface was also tested for comparative purposes. Abrasion resistance was evaluated by measuring the haze of each coating before and after subjecting the coatings to abrasion tests. A smaller change in haze value indicates that a coating is more abrasion resistant, whereas a large change in haze value indicates lesser abrasion resistance. All haze measurements were obtained on a Hunter Lab Ultra Scan I unit following procedures according to ASTM D4060 for Samples 1–5 and on a Hunter Lab Color Quest XE for the remaining Samples. Unless stated otherwise, all abrasion tests were carried out on a Taber Abraser using a CS-10F abrading wheel at an abrading load of 500 grams (that is, 500 gram total weight evenly distributed on the two abrading wheels) for 1000 abrading cycles.

Samples 1–4 below were all prepared so that the compositions prepared comprised 15 weight percent inorganic phase, 25 weight percent cross-linker, and 60 weight percent liquid medium. Samples 1–4 differed only in the composition of the inorganic phases. In all four samples, the cross-linker used was 3-glycidoxypropyltrimethoxy-silane (available as Z-6040 from Dow Corning). In all four samples, the liquid medium used was water.

Sample 1

An alumina sol (available as stock No.12733 from Alpha) was used to provide the inorganic phase. The alumina sol was a 20 weight percent colloidal suspension in water, having a pH of 4.0, a particle size of 50 nanometers, and a positive particle charge. The alumina sol was mixed with 3-glycidoxypropyl-trimethoxysilane and water. The mixture was sonicated for 2.5 minutes using a VibraCell 700 Watt ultrasonic horn (available from Sonics and Materials), at a 30 percent amplitude setting. The mixture was then allowed to stand at room temperature for 2.5 hours without additional stirring.

The mixture was then applied to corona-treated polycarbonate substrates using a spin coater (available from Headway Research) at 900 rpm for 1 minute. After the spin coating, the coating was cured by heating the coated substrates in a Thelco oven at 120° C. for 45 minutes. The coated substrates were then air cooled to room temperature.

The coated substrates were measured for haze. The haze was measured at 0.43 percent. Next, the coated samples were subjected to abrasion tests. Haze was again measured from at least 4 different spots on the wear track produced by the abrasion testing. The haze measurements were averaged and used for comparison. The average haze measurement after abrasion testing was 19.80 percent.

Sample 2

Compositions and coatings were prepared in the same manner as Sample 1 except that a silica sol (available as Ludox-TMA from W. R. Grace) was used in place of the alumina sol. The silica sol was a 34 percent colloidal suspension in water, having a pH from 4 to 7, a particle size of 22 nanometers, a specific surface area of 140 m$^2$/g, and a negative particle charge.

Haze measurements were taken for Sample 2 coatings in the same manner as the haze measurements for Sample 1. The haze measurement prior to abrasion testing was 0.52 percent and the haze measurement after abrasion testing was 19.61 percent.

Sample 3

Compositions and coatings were prepared in the same manner as Sample 2, except that instead of using only a silica sol to provide the inorganic phase, the inorganic phase was provided using a mixture of the same silica sol used in Sample 2 and an aluminum salt. The aluminum salt was aluminum chloride hexahydrate (available from Aldrich). While the total inorganic phase remained 15 weight percent of the overall composition, 95 weight percent of the inorganic phase was provided by the silica sol and 5 weight percent (calculated as $AlO_{1.5}$) of the inorganic phase was provided by the aluminum chloride hexahydrate.

Haze measurements were taken for Sample 3 coatings in the same manner as the haze measurements for Sample 2. The haze measurement prior to abrasion testing was 0.40 percent and the haze measurement after abrasion testing was 3.85 percent.

Sample 4

Compositions and coatings were prepared in the same manner as Sample 3, except that a mixture of aluminum nitrate and the same silica sol was used to provide the inorganic phase. The aluminum nitrate is available as aluminum nitrate nonahydrate from Aldrich. While the total inorganic phase remained at 15 weight percent of the overall composition, 95 weight percent of the inorganic phase was provided by the silica sol and 5 weight percent of the inorganic phase was provided by the aluminum nitrate.

Haze measurements were taken for Sample 4 coatings in the same manner as the haze measurements for Sample 3. The haze measurement prior to abrasion testing was 0.36 percent and the haze measurement after abrasion testing was 7.32 percent.

Sample 5

One part by weight of the same aluminum salt used in Sample 3 was dissolved in 3 parts of deionized water at room temperature. Fifteen parts of the same cross-linker used in Sample 3 was mixed into the salt solution. Mixing was continued for about 5 minutes with heat release and the mixture turned clear. Thirty parts by weight of a silica sol (available as Ludox-Cl from DuPont) was added to the mixture, which brought the temperature down to close to ambient. The silica sol used was a 30 weight percent suspension in water, having a pH of 4.5, a particle size of 12 nanometers, a specific surface area of 230 m$^2$/g, and a positive particle charge. The mixture was then sonicated for 2.5 minutes as in Sample 3

The resulting solution was applied to a corona treated polycarbonate substrate by spin coating at a spin rate of 800 rpm for 1 minute. The coated substrates were cured in the same manner as Sample 3.

Abrasion resistance was tested in the same manner as Sample 3 except that 2000 abrading cycles were used instead of 1000 abrading cycles. The haze measurement taken before abrasion testing was 0.40 percent and the haze measurement taken after abrasion testing was 2.66 percent.

Glass Sample

Glass samples of ⅛ inch (0.3173 cm) were abrasion tested in the same manner as Samples 1–4. The initial haze measurement was 0.09 percent and the haze measurement after abrasion testing was 1.34 percent.

TABLE I

|  | Haze Before Abrasion | Haze After Abrasion |
| --- | --- | --- |
| Glass Sample | 0.09% | 1.34% |
| Sample 1 | 0.43% | 19.80% |
| Sample 2 | 0.52% | 19.61% |
| Sample 3 | 0.40% | 3.85% |
| Sample 4 | 0.36% | 7.32% |
| Sample 5 | 0.40% | 2.66%* |

*Abrasion testing on Sample 5 was performed for 2000 abrading cycles, whereas abrasion testing for all other samples was performed for 1000 abrading cycles.

Sample 6

Three storage stable solutions of coating formulations were prepared using a colloidal silica sol, commercially available as Ludox TMA from W. R. Grace, having a particle diameter of 22 nm, and containing 34 weight percent $SiO_2$, which was added to an epoxy silane, identified as 3-glycidoxypropyltrimethoxysilan, commercially available from Dow Corning a s Z-6040, and the solution was stirred for 5 minutes using a magnetic stirbar, after which one of non-hydrogen Lewis Acids was added, either aluminum perchlorate $Al(ClO_4)_3$, ytterbium trifluoromethanesulfonate $Yb(OSO_2CF_3)_3 \cdot H_2O$ (also known as ytterbium triflate), and zinc trifluoromethanesulfonate $Zn(OSO_2CF_3)_2$ (also known as zinc triflate), all in equimolar amounts was added with stirring for 1.75 hours at room temperature. Then surfactant, isopropanol and deionized water was added with stirring for 5 minutes after which the solution was sonicated at 91% amplitude of a 600 watt high intensity ultrasonic processor operating at a frequency of 20 kilohertz for 5 minutes at room temperature. Then each completed formulation was evenly distributed in 5 separate 120 ml bottles, which were sealed and kept at room temperature until tested at intervals. The complete formulations, all in weight percent, are given below:

| Sample 6A - Aluminum perchlorate | |
|---|---|
| TMA | 34.23 |
| Z6040 | 22.88 |
| 10% Al(ClO$_4$)$_3$ | 1.86 |
| 1% Byk333 | 2.86 |
| 1% FSO | 1.86 |
| Isopropyl alcohol | 7.63 |
| Deionized water | 28.60 |

| Sample 6B - Ytterbium triflate | |
|---|---|
| TMA | 34.23 |
| Z6040 | 22.88 |
| 10% Yb triflate | 3.62 |
| 1% Byk333 | 2.86 |
| 1% FSO | 1.86 |
| Isopropyl alcohol | 7.63 |
| Deionized water | 26.88 |

| Sample 6C - zinc triflate | |
|---|---|
| TMA | 34.23 |
| Z6040 | 22.88 |
| 10% Zn triflate | 2.10 |
| 1% Byk333 | 2.86 |
| 1% FSO | 1.86 |
| Isopropyl alcohol | 7.63 |
| Deionized water | 28.40 |

The samples were coated on a primed polymethylmethacrylate (PMMA) substrate and cured at 87° C. for 2 hours. The primer consisted to 87.04 wt % 4-hydroxy-4-methyl-2-pentanone (DAA), 3.29 wt. % acrylic-latex emulsion (Hycar26120 from BFGoodrich) and 9.67 wt % acrylic resin (Paraloid A-21LV 30% by Rohm and Haas). The primer was allowed to flash off for 15–20 minutes before the coating solution was applied. After the samples were cured, the coated PMMA samples were Taber abraded for 300 cycles under a 500 gram load per wheel and the data showing the haze before and after were taken. The difference was given as delta haze percent. One non-abraded sample from each formula was placed along side of the abraded samples to observe the differences. The results are given in Table II.

TABLE II

Abrasion Resistance for Sample 6

| Sample No. | pH | Taber Percent Haze Value |
|---|---|---|
| 6A | 2.85 | 2.5% |
| 6B | 5.4 | 1.8% |
| 6C | 5.8 | 1.5% |

Sample 7

7A. Three grams of 3-glycidoxypropyltrimethoxysilane, identified as Z6040 from Dow Corning Co. and 0.10 g. of a 1 wt. % solution of a fluorosurfactant, identified as Zonyl® FSO-100 from DuPont was added to 8 g. of colloidal silica, identified as Ludox® TMA, from W. R. Grace, having average 22 nm particle size. The colloidal silica and epoxy silane are stirred and cooled in an ice bath. To the stirred two phase liquid was slowly added 0.194 g. (0.41 mil equ.) of aluminum trifluoromethanesulfonate in 1.0 g. water. After stirring for 15 min., the formulation was stored in a refrigerator at about 2° C. The formulation is coated on a 4 by 4 inch square of window pane glass about 0.1 in. thick and on microscope slides using a draw down rod and the samples are cured in an oven at 85° C. for 15 hours giving a coating thickness of about 10 micron. A coated 4 inch square sample gave a Taber of 6.1 haze after 1000 cycles, using the procedure outline hereinabove. A coated microscope slide had a Knoop hardness of 173, using the procedure provided in the Journal of Research of the National Bureau of Standards, vol. 23, July 1939, page 29, which is incorporated herein by reference.

Samples 7B–G. Formulations similar to Sample 6A are prepared by a similar method using 0.41 mole of compatible metal compounds identified in the table below. The metal compound was added to a cooled and stirred liquid mixture of 8.0 g. of colloidal silica, Ludox® TMA from W. R. Grace, 3 g. of 3-glycidoxypropyltrimethoxysilane, Z6040 from Dow Corning Co., 1.0 g. of methanol and 1.0 wt. % of methanol solution of fluorosurfactant Zonyl® FSO-100 from DuPont. Following the procedure of Sample 6A, the coating solution was mixed and coated onto 4 inch square window pane glass pieces to a coating thickness of about 10 microns and similarly with microscope slide glass samples. The Knoop hardness, Yellow Index and Taber Percent Haze Values are given in Table III below:

TABLE III

Affect of Curing Agent on Hardness and Color

| Sample No. | Curing Agent - 0.41 mol. Eq. | Knoop Value - 1 hr cure | Knoop Value - 15 hr cure | Yellow Index - 85° C., 15 hr | Taber Percent Haze Value - 1000 cyc., 15 hr. |
|---|---|---|---|---|---|
| 7B | Al—TFA* | 113 ± 6 | 134 ± 13 | 0.05 | 10.7 ± 0.8 |
| 7C | Al(ClO$_4$)$_3$ | 142 ± 3 | 192 ± 1 | 2.19 | 6.7 ± 0.8 |
| 7D | Yb—TRIF+ | 145 ± 4 | 184 ± 6 | 0.48 | 8.7 ± 0.4 |
| 7E | AlCl$_3$ | 112 ± 4 | 137 ± 2 | 0.07 | 6 ± 3 |
| 7F | 5:1 Zn—TRIF:AlCl$_3$** | 186 ± 6 | 197 ± 6 | −0.42 | 4.1 ± 0.5 |
| 7G | 1:1 Yb—TRIF:Zn—TRIF++ | 176 ± 4 | 195 ± 6 | — | — |

*TFA means trifluoroacetate.
+TRIF means trifluoromethanesulfonate or triflate.
**Indicates a 5 to 1 molar ratio of Zn—TRIF to AlCl$_3$ and total of 0.41 moles.
++Indicates a 1 to 1 molar ratio of Yb—TRIF to Zn—TRIF and a total of 0.41 moles.

Samples 7H—and comparison with other anions. A formulation was prepared in the same manner as Samples 7A–C, and E with aluminum acetate as Sample 7H. The previous data are presented with information on Sample 7H to show the affect of the anion on hardness using the Knoop method, as seen in Table IV

TABLE IV

Affect of Anion

| Sample No. | Metal Cmpd | Knoop Value - 1 hr cure, 85° C. | Knoop Value - 15 hr cure, 85° C. |
|---|---|---|---|
| 7E | AlCl$_3$ | 112 ± 4 | 137 ± 2 |
| 7H | Al Acetate | 103 ± 8 | 122 ± 7 |
| 7B | Al Trifluoro Acetate | 113 ± 6 | 134 ± 13 |
| 7C | Al(ClO$_4$)$_3$ | 142 ± 3 | 192 ± 1 |
| 6A | Al Triflate | 150 ± 2 | 172 ± 9 |

Sample 8

Several formulations were prepared using various UV-A materials in the coating composition or in primers which were applied to the substrate prior to application of the hard coating materials of this invention.

Sample 8A—similar to prior samples the formulation included the following ingredients:

| | |
|---|---|
| Colloidal silica, Ludox | 26.63 g. |
| Epoxy silane, Z6040 | 26.63 g. |
| Aluminum perchlorate | 3.65 g. |
| Fluorosurfactant, Zonyl FSO-100 | 3.09 g. |
| Deionized water | 9.0 g |

The components were mixed and sonicated following the general procedures for previous samples. The solution was flow coated on 4×4 inch polycarbonate squares with primer previously applied and cured. The 30-minute cured coated sample passed a dry adhesion cross hatch scratch test. The Taber abrasion test gave a delta haze of 2.34% after an initial haze reading of 0.54%, an initial Yellowness Index reading of 0.8 and a delta Yellowness Index of 0.02.

Sample 8B—The above Sample 8A was repeated with the addition of 0.75 g. of a benzotriazole UV-A blocker, Tinuvin 5151 hindered amine light stabilizer (HALS). On application of this hard coating formulation to 4×4 inch polycarbonate squares which were also primed, the Taber abrasion was a delta haze of 2.33% from an initial haze reading of 0.51, an initial Yellowness Index of 0.78 and a delta Yellowness Index of 0.02.

Sample 9

Samples 9A–C illustrate formulations of various primers which can be employed in this invention as shown in the following Table V in which all values are parts by weight:

TABLE V

Primer Formulations

| Sample No | 8A | 8B | 8C |
|---|---|---|---|
| Paraloid A-21 | 2.0 | 2.0 | 0.8 |
| Carboset CR-781 | 0.7 | 0.7 | 0.6 |
| Dowanol PM | 45 | 22.5 | 0 |
| Diacetone Alcohol | 0 | 2.5 | 45 |

The above formulations were mixed together and stirred for 30 minutes without heat, then flow coated onto polycarbonate substrates and allowed to dry at room temperature for about 20 minutes. Then the hard coating formulation was applied using dip or flow coat methods.

The hard coat formulation, also in parts by weight is given in the following Table VI:

TABLE VI

Hard Coat Formulations

| Sample No. | 8D | 8E | 8F |
|---|---|---|---|
| 3-Glycidoxypropyltrimethoxysilane | 21 | 16.3 | 21 |
| Cerium oxide aqueous sol (20% concentration) | 35.6 | 40.8 | 31.5 |
| Aluminum perchlorate in water at 1:10 | 3.4 | 2.9 | 3.4 |
| Zonyl FSO fluoroaurfactant in water at 1:100 | 2.4 | 2.4 | 2.4 |

The above formulations 9D–F were mechanically stirred for 10 minutes then sonicated by an ultrasonic horn for 30 seconds at about 180 watts power level. On to the primer coated Samples 9A–C, the Formulations 9D–F were applied using dip or flow coat method. The samples were cured at 120–125° C. for 1 hour in air.

The cured coatings passed the cross-hatch dry adhesion test, showed no loss of adhesion after 1 hour in boiling water (100° C.) test. The abrasion resistance of the hardcoat was measured by Taber abrasion test as indicated above except under load of 500 grams on the CS-10F wheel for 500 cycles and showed an average haze increase of around or better than 1% per 100 Taber cycles. Accelerated weathering tests were carried out in a Suntest CPS unit using a NXE 1500B UV lamp without filtration. The coated polycarbonate showed no signs of delamination, microcracking or yellowness increase after 550 hours of UV exposure, the initial Yellowness Index being 1.53 and after 550 hours exposure the Yellowness Index was 1.25.

What is claimed is:

1. An aqueous solution of a coatable composition for preparing a hard coating comprising:
   (a) water;
   (b) at least one dispersion of particles in a dispersion medium, said particles selected from the group consisting of inorganic particles and inorganic-organic composite particles, said particles having a size of from about 1 nanometer to about 100 nanometers;
   (c) at least one inorganic non-hydrogen Lewis Acid different from the particles of component (b); and
   (d) at least one epoxy group-containing silicon compound;
      said dispersion of particles being present in said composition such that said composition contains from about 1 to about 50 weight percent of said particles in the total weight of said composition; said non-hydrogen Lewis Acid being present in said composition such that said composition contains from about 0.1 to about 30 weight percent of said non-hydrogen Lewis Acid in the total weight of said composition; and
      said epoxy group-containing silicon compound being present in said composition such that said composition contains from about 1 to about 50 weight percent of said epoxy group-containing silicon in the total weight of said composition.

2. The coatable composition according to claim 1, wherein said particles are inorganic particles selected from the group consisting of oxides, hydroxides, phosphides, sulfides, silicides, nitrides, borides, carbides, carbonates, fluorides and oxyhalides.

3. The coatable composition according to claim 2, wherein said inorganic particles are oxides selected from the group consisting of alumina, calcium oxide, ceria, magnesium oxide, silica, titania, zirconia and homogeneous alloys thereof.

4. The coatable composition according to claim 2, wherein said inorganic particles are oxides which are heterogeneous particles comprising two or more of said oxides.

5. The coatable composition according to claim 4, wherein said heterogeneous particles are comprised of silica and alumina.

6. The coatable composition according to claim 1, wherein said inorganic particles have a size of from about 1 nanometer to about 30 nanometers.

7. The coatable composition according to claim 1 wherein said dispersion of inorganic particles is substantially uniformly distributed in said composition.

8. The coatable composition according to claim 1, wherein component (b) said dispersion of particles in a dispersion medium contains inorganic particles having organic compounds attached to the surface of said inorganic particles.

9. The coatable composition according to claim 8, wherein said organic compounds are organosilicon compounds.

10. The coatable composition according to claim 1, wherein component (b) said dispersion of particles in a dispersion medium contains inorganic-organic particles, in which inorganic compounds are peripherally disposed about a central organic compound.

11. The coatable composition according to claim 10, wherein said central organic compound is selected from a thermoplastic or a thermoset polymer resin and said inorganic compounds are selected from the group consisting of oxides, hydroxides, phosphides, sulfides, silicides, nitrides, borides, carbides, carbonates, fluorides, and oxyhalides.

12. The coatable composition according to claim 11, wherein said inorganic compounds are oxides selected from the group consisting of alumina, calcium oxide, ceria, magnesium oxide, silica, titania, zirconia and homogeneous alloys thereof.

13. The coatable composition according to claim 1, wherein said coatable composition comprises, in addition, the hydrolyzate and condensation product of said epoxy group-containing silicon compound.

14. The coatable composition according to claim 1, wherein the epoxy group-containing silicon compound has the general formula

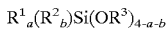

$$R^1_a(R^2_b)Si(OR^3)_{4-a-b}$$

wherein $R^1$ is selected from an epoxy-containing organic group, $R^2$ is selected from C1–6 hydrocarbyl groups, a vinyl group, and hydrogen; $R^3$ is selected from C1–5 hydrocarbyl groups, a C2–12 alkoxyalkyl group, and a C1–4 acyl group; a is an integer from 1 to 3, b is an integer from 0 to 2, providing that the sum of a plus b is less than or equal to 3.

15. The coatable composition according to claim 14, wherein said coatable composition comprises, in addition, the hydrolyzate and condensation product of said epoxy group-containing silicon compound.

16. The coatable composition according to claim 14, wherein said epoxy group-containing silicon compound is a glycidoxyalkyltrialkoxysilane in which said alkyl group has from 1 to about 6 carbon atoms and said alkoxy group has from 1 to about 5 carbon atoms.

17. The coatable composition according to claim 16, wherein said coatable composition comprises, in addition, the hydrolyzate and condensation product of said epoxy group-containing silicon compound.

18. The coatable composition according to claim 16, wherein said epoxy group-containing silicon compound is gamma-glycidoxypropyltrimethoxysilane.

19. The coatable composition according to claim 18, wherein said coatable composition comprises, in addition, the hydrolyzate and condensation product of said epoxy group-containing silicon compound.

20. The coatable composition according to claim 1 wherein the non-hydrogen Lewis Acid is represented by the general formula

$$M_mX_n$$

in which M is a cation selected from groups 2, 3, 4, 5, 6, 7, 8, 9, 10, 11, 12, 13, 14, the Lanthanide Series, and the Actinide Series of the Periodic Table; X is a counterion; m is an integer from 1 to 3; and n is an integer from 1 to 3.

21. The coatable composition according to claim 20, wherein M is a hydrolytically stable cation.

22. The coatable composition according to claim 21, wherein M is selected from the group comprising $Ag^{+1}$, $Cd^{+2}$, $Ce^{+3}$, $Co^{+2}$, $Cu^{+2}$, $Dy^{+3}$, $Er^{+3}$, $Eu^{+3}$, $Fe^{+2}$, $Gd^{+3}$, $Ho^{+3}$, $La^{+3}$, $Lu^{+3}$, $Mg^{+2}$, $Mn^{+2}$, $Nd^{+3}$, $Ni^{+2}$, $Pb^{+2}$, $Pr^{+3}$, $Sm^{+3}$, $Tb^{+3}$, $Tm^{+3}$, $Y^{+3}$, $Yb^{+3}$, $Zn^{+2}$.

23. The coatable composition according to claim 20, wherein M is selected from aluminum, zinc and ytterbium.

24. The coatable composition according to claim 20, wherein X is selected from the group comprising halogen, perhalogenate, alkanesulfonate, perhaloalkanesulfonate, perhaloalkanecarboxylate, sulfur oxide anions, and nitrogen oxide anions.

25. The coatable composition according to claim 20, wherein X is selected from the group comprising chloride, sulfate, perchlorate, trifluoroacetate, methanesulfonate, trifluoromethanesulfonate, and nitrate.

26. The coatable composition according to claim 1, wherein the coatable composition comprises in addition a liquid medium which can be the same or different from the dispersion medium of component (b).

27. The coatable composition according to claim 26, wherein said liquid medium is an organic solvent selected from the group comprising alcohols, ether alcohols, ether esters, acetate esters, lactate esters and ketones, each individually having from 1 to about 12 carbon atoms.

28. The coatable composition according to claim 27, wherein said liquid medium is an alcohol having from 1 to about 5 carbon atoms.

29. The coatable composition according to claim 28, wherein said alcohol contains at least one methyl, ethyl, isopropyl or n-butyl group.

30. The coatable composition according to claim 27, wherein said liquid medium is an ether alcohol which is selected from the group comprising propylene glycol monomethyl ether, propylene glycol mono-n-propyl ether, and propylene glycol n-butyl ether.

31. The coatable composition according to claim 27, wherein said liquid medium is a ketone which is selected from the group consisting of acetone and diacetone alcohol.

32. The coatable composition according to claim 1 wherein said coatable composition comprises, in addition, a UV light absorber or hindered amine light stabilizer or both.

33. The coatable composition according to claim 32 wherein said coatable composition comprises, in addition, a UV light absorber which is a benzotriazole.

34. A coated article coated with a hard coating produced by the steps of
   (i) mixing
      (a) water;
      (b) at least one dispersion of particles in a dispersion medium, said particles selected from the group consisting of inorganic particles and inorganic-organic composite particles, said particles having a size of from about 1 nanometer to about 100 nanometers;
(c) at least one inorganic non-hydrogen Lewis Acid different from the particles of component (b); and
(d) at least one epoxy group-containing silicon compound to form a composition mixture;
said dispersion being present in said composition such that said composition contains from about 1 to about 50 weight percent of said particles in the total weight of said composition; said non-hydrogen Lewis Acid being present in said composition such that said composition contains from about 0.1 to about 30 weight percent of the total weight of said non-hydrogen Lewis Acid in said composition; and said epoxy group-containing silicon compound being present in said composition such that said composition contains from about 1 to about 50 weight percent of said epoxy group-containing silicon the total weight of said composition;
(ii) applying said composition mixture to at least one surface of a substrate to be coated; and
(iii) curing said composition mixture to form an abrasion resistant coating on said substrate.

35. The coated article according to claim 34, wherein in said composition said particles are inorganic particles selected from the group consisting of oxides, hydroxides, phosphides, sulfides, silicides, nitrides, borides, carbides, carbonates, fluorides and oxyhalides.

36. The coated article according to claim 35, wherein in said composition said inorganic particles are oxides selected from the group consisting of alumina, calcium oxide, ceria, magnesium oxide, silica, titania, zirconia and homogeneous alloys thereof.

37. The coated article according to claim 35, wherein in said composition said inorganic particles are oxides which are heterogeneous particles comprising two or more of said oxides.

38. The coated article according to claim 37, wherein in said composition said heterogeneous particles are comprised of silica and alumina.

39. The coated article according to claim 34, wherein in said composition said dispersion of inorganic particles is substantially uniformly distributed in said composition.

40. The coated article according to claim 34, wherein in said composition said dispersion of inorganic particles contains inorganic particles having organic compounds attached to the surface of said inorganic particles.

41. The coated article according to claim 34, wherein in said composition said organic compounds are organosilicon compounds.

42. The coated article according to claim 34, wherein in said composition said dispersion of inorganic-organic particles contains inorganic-organic particles, in which inorganic compounds are peripherally disposed about a central organic compound.

43. The coated article according to claim 42, wherein in said composition said central organic compounds are selected from thermoplastic or thermoset polymer resins and said inorganic compounds are selected from the group consisting of oxides, hydroxides, phosphides, sulfides, silicides, borides, carbides, carbonates, fluorides and oxy halides.

44. The coated article according to claim 43, wherein in said composition said inorganic compounds are oxides selected from the group consisting of alumina, calcium oxide, ceria, magnesium oxide, silica, titania and zirconia.

45. The coated article according to claim 34, wherein said composition further comprises, in addition, the hydrolyzate and the condensation product of said epoxy group-containing silicon compound.

46. The coated article according to claim 34, wherein in said composition said epoxy group-containing silicon compound has the general formula $$R^1_a(R^2_b)Si(OR^3)_{4-a-b}$$

wherein $R^1$ is selected from an epoxy-containing organic group, $R^2$ is selected from C1–6 hydrocarbyl groups, a vinyl group, and hydrogen; $R^3$ is selected from C1–5 hydrocarbyl groups, a C2–12 alkoxyalkyl group, and a C1–4 acyl group; a is an integer from 1 to 3, b is an integer from 0 to 2, providing that the sum of a plus b is less than of equal to 3.

47. The coated article according to claim 46, wherein said composition comprises, in addition, the hydrolyzate and condensation product of said epoxy group-containing silicon compound.

48. The coated article according to claim 46, wherein in said composition said epoxy group-containing silicon compound is a glycidoxyalkyltrimalkoxysilane in which said alkyl group has from 1 to about 6 carbon atoms and said alkoxy group has from 1 to about 5 carbon atoms.

49. The coated article according to claim 46, wherein in said composition said epoxy group-containing silicon compound is gamma-glycidoxypropyltrimethoxysilane.

50. The coated article according to claim 34, wherein in said composition the non-hydrogen Lewis Acid is represented by the general formula $$M_mX_n$$

in which M is a cation selected from groups 2, 3, 4, 5, 6, 7, 8, 9, 10, 11, 12, 13, 14, the Lanthanide Series, and the Actinide Series of the Periodic Table; X is a counterion; m is an integer from 1 to 3; and n is an integer from 1 to 3.

51. The coated article according to claim 50, wherein in said composition M is a hydrolytically stable cation.

52. The coated article according to claim 51, wherein in said composition M is selected from the group comprising $Ag^{+1}$, $Cd^{+2}$, $Ce^{+3}$, $Co^{+2}$, $Cu^{+2}$, $Dy^{+3}$, $Er^{+3}$, $Eu^{+3}$, $Fe^{+2}$, $Gd^{+3}$, $Ho^{+3}$, $La^{+3}$, $Lu^{+3}$, $Mg^{+2}$, $Mn^{+2}$, $Nd^{+3}$, $Ni^{+2}$, $Pb^{+2}$, $Pr^{+3}$, $Sm^{+3}$, $Tb^{+3}$, $Tm^{+3}$, $Y^{+3}$, $Yb^{+3}$, $Zn^{+2}$.

53. The coated article according to claim 50, wherein in said composition M is selected from aluminum, zinc and ytterbium.

54. The coated article according to claim 50, wherein in said composition X is selected from the group comprising halogen, perhalogenate, alkanesulfonate, perhaloalkanesulfonate, perhaloalkanecarboxylate, sulfur oxide anions and nitrogen oxide anions.

55. The coated article according to claim 50, wherein in said composition X is selected from the group comprising chloride, sulfate, perchlorate, trifluoroacetate, methanesulfonate, trifluoromethanesulfonate and nitrate.

56. A cured composition produced by the process which comprises the steps of
(i) mixing together
(a) water;
(b) at least one dispersion of particles in a dispersion medium, said particles selected from the group consisting of inorganic particles and inorganic-organic composite particles, mixture, said particles having a size of from about 1 nanometer to about 100 nanometers;
(c) at least one inorganic non-hydrogen Lewis different from the particles of component (b); and (d) at least one epoxy group-containing silicon compound, to form a composition mixture; said dispersion substantially uniformly distributed in the composition mixture and (ii) curing said composition mixture to form an abrasion resistant cured composition.

57. The coated article according to claim 34, wherein said substrate is a synthetic organic polymer.

58. The coated article according to claim 34, wherein said substrate is a metal.

59. The coated article according to claim 34, wherein said substrate is a synthetic organic polymer having a metallized surface.

60. The coated article according to claim 57, wherein said synthetic organic polymer is selected from the group comprising polycarbonate, polymethylmethacrylate, polyolefin, polyurethane, polyvinyl chloride, and polyethylene terephthalate, polyethylene naphthenate, polyester, polysullfone, epoxy resins and polyurea.

61. The coated article according to claim 34, wherein said substrate is glass.

62. The coated article according to claim 34, wherein said substrate is a silicon wafer.

63. The coated article according to claim 34, wherein a primer is applied to said substrate prior to applying said mixture.

64. The coated article according to claim 63 wherein the primer comprises a latex, an thermoplastic polymer or a mixture thereof.

65. The coated article according to claim 34 wherein said substrate is corona discharge treated prior to applying said mixture.

66. The coated article according to claim 34, wherein said substrate is corona discharge treated and wherein a primer is applied to said corona discharge treated substrate prior to applying said mixture.

* * * * *